United States Patent Office 2,942,299
Patented June 28, 1960

2,942,299

PROCESS OF MAKING OILED CARBON BLACK PELLETS

Harold A. Larson, Borger, Tex., assignor to Phillips Petroleum Company, a corporation of Delaware No Drawing. Filed Dec. 27, 1955, Ser. No. 555,226

8 Claims. (Cl. 18—47.5)

This invention relates to a method or process for producing oiled carbon black pellets of substantially uniform oil concentration.

Carbon black is conventionally pelleted after recovery of the black from the furnaces and before shipping or use, for convenience in handling and using the black. Various methods of pelleting are in use, each of which produces small pellets of a substantial range of sizes. A common method of pelleting carbon black entails feeding the loose black into an end section of a rotating horizontally elongated pelleting mill, together with pellet nuclei, whereby the loose flocculent black is formed into small pellets by rolling and tumbling as the material passes thru the mill to an outlet weir at the delivery end of the mill opposite the feed end.

One of the conventional uses of carbon black is in the compounding of rubber which requires the use of an extender oil in the compounding process and resulting composition. It has been found feasible and convenient to add the oil to the pellets in the proper concentration for compounding, and a very effective method of incorporating the oil in the pelleted black is disclosed and claimed in the copending application of Fred Rowe, Jr., and Wilson H. Rushford, entitled "Incorporation of Extender Oil in Carbon Black," filed August 28, 1953. In the process of said application, carbon black pellets of a range of sizes are fed into a rotating drum while continuously weighing the pellet feed to the drum and spraying an extender oil into the bed of carbon black pellets in the drum at a rate determined by the rate of feed so as to incorporate in the pellets a desired concentration of oil, preferably in the range of 7 to 9 weight percent of the oiled pellets. However, the amount of oil incorporated in the pellets is determined by the use to which the pellets are to be put and may range from 2 to 25 weight percent of the oiled pellets. It is also feasible to simultaneously pellet loose carbon black and incorporate oil into the resulting pellets by spraying the oil in regulated amounts onto the bed of carbon black and pellets in the pelleting mill, although it is considerably more difficult to control the concentration of the oil in the carbon black pellets by this method because of the difficulty of feeding the loose black at a constant rate and measuring the rate of feed of loose black to the pelleting process under varying feed rate conditions so as to permit close regulation of the flow of oil to the mill.

I have unexpectedly found that the oiled pellets obtained by spraying oil onto an agitated mass of carbon black pellets in a regulated quantity to produce pellets of controlled oil concentration results in the production of pellets of a substantial range of oil concentration in accordance with the size of the pellets in the mass. I have found that the larger pellets in the mass of oiled pellets contain a higher concentration of oil than the smaller pellets in the mass, although it would be expected that the smaller pellets would contain a large concentration of oil because of the fact that they have a larger surface area per unit mass or volume than larger pellets.

I have also found that pellets oiled in accordance with the process disclosed in the above identified application when stored in a large storage tank distribute themselves upon delivery thereto thru a common delivery spout into segregated masses somewhat in accordance with the pellet size and that when pellets were removed from the storage tank which had two pull spouts, there were a number of instances where pellets from one pull spout were on specification (i.e. the oil concentration was in the range of 7 to 9 parts of oil per 100 parts of carbon black) and pellets from the other pull spout were definitely off specification. This was caused by the accumulation over one pull spout of large pellets and the accumulation over the other pull spout of smaller pellets. The pellets were originally introduced or delivered to the storage tank thru a spout leading into the side of the tank. Now, if the average oil concentration in the pellets from the oiling mill is in the lower part of the specification range, the smaller pellets have an oil concentration below specification and the larger pellets have an oil concentration within the specification range. Conversely, if the average composition is on the high side, the large pellets have too high an oil concentration while the small pellets have an oil concentration within specification range.

The principal object of the invention is to provide a process or method for obtaining masses of oiled carbon black pellets from a large mass of oiled pellets of more nearly uniform concentration than the oil concentration of the original mass. Another object is to provide a process for producing a mass of oiled carbon black pellets of substantially uniform oil concentration thruout the mass. A further object is to improve the flow characteristics of a mass of oiled carbon black pellets for storage and shipping purposes. Other objects of the invention will become apparent from a consideration of the accompanying disclosure.

The process of the invention, in its broader aspects, is concerned with obtaining from a mass of oiled pellets of varying sizes at least one mass of pellets of more nearly uniform oil concentration than the oil concentration in the original mass and comprises separating the original mass into a plurality of masses in accordance with the sizes of the pellets to provide masses of pellets of more nearly uniform size and therefore, of more nearly uniform oil concentration. Carbon black pellets are formed in conventional manner and are sprayed with oil while being agitated, preferably, in a cylindrical drum rotating on its horizontal axis. The amount of oil sprayed onto the pellet mass is, of course, regulated so as to provide the desired oil concentration in the composit mass. The pellets of various sizes carrying different concentrations of oil are then classified according to size to provide individual masses of pellets of relatively uniform size and also of relatively uniform oil concentration. It is also within the purview of the invention to simultaneously oil and pellet carbon black and thereafter classify the oiled pellets according to size in order to obtain masses of pellets of more nearly uniform oil concentration and of more desirable flow characteristics which facilitates flowing of the material into shipping cartons and hopper cars for transportation to the point of storage and/or use of the pellets.

While the particular pellet-oiling process of the aforesaid application impregnates the larger pellets with a higher concentration of oil than the smaller pellets, it is possible that oiling carbon black pellets by other techniques may effect a higher concentration of oil in the smaller pellets than in the larger pellets. One possible method of oiling carbon black pellets is by maintaining a fluidized bed of the pellets in the manner of fluidized catalyst beds and spraying oil into the fluidized bed from one or more selected areas. In this type of process as well as practically any conceivable oiling process, the distribution of oil will be greater to either the larger or smaller pellets. It is to be understood that the invention is also applicable to the segregation of pellets into size classifications to provide masses of pellets of uniform oil concentration even where the higher oil concentration is in the smaller pellets.

In order to illustrate the invention, size classification and oil concentration data obtained from a study of oiled pellets which were oiled in accordance with the process disclosed in the aforesaid application are presented in the following table.

Table

SAMPLE NO. 1

| | | −10 | |
|---|---|---|---|
| Pellet size, U.S. Sieve | +10 | +18 | −18 |
| Oil concentration, parts oil/100 parts black | 22.0 | 12.9 | 5.9 |

SAMPLE NO. 2

| | | |
|---|---|---|
| Pellet size, U.S. Sieve | +14 | −14 |
| Oil concentration, parts oil/100 parts black | 11.5 | 6.8 |

SAMPLE NO. 3

| | | −10 | −18 | −35 | |
|---|---|---|---|---|---|
| Pellet size, U.S. Sieve | +18 | +35 | +60 | −60 |
| Percent of sample in each size | 56.42 | 31.96 | 7.08 | 4.54 |
| Oil concentration, parts oil/100 parts black | 9.96 | 6.64 | 6.22 | 6.53 |
| Calculated oil concentration of composite based on data above. | 8.48 parts oil/100 parts black. | | | |
| Measured oil concentration of above sample. | 8.79 parts oil/100 parts black. | | | |

In the data relative to Sample No. 3, it can be seen that while the measured oil concentration of the sample was 8.79 parts of oil per 100 parts of black, the pellets passing through a 10 mesh screen and held on an 18 mesh screen (56.42% of the sample) have an oil concentration of 9.96; pellets passing thru an 18 mesh screen and held on a 35 mesh screen (31.96% of the sample) have an oil concentration of 6.64; pellets passing thru a 35 mesh screen and held on a 60 mesh screen (7.08% of the sample) have an oil concentration of 6.22; and pellets passing thru a 60 mesh screen (4.54% of the sample) have an oil concentration of 6.53 parts per 100 parts of black. It is readily apparent from these data that pellets which pass thru an 18 mesh screen have a substantially uniform concentration of oil.

By classification of the oiled pellets in the manner of the invention, it is feasible to supply different users of the pellets with the substantially exact amount of oil desired and required by the user. Using Sample No. 3 pellets as illustrative, it is possible to operate the oiling mill to incorporate an average of 8 to 9 parts of oil per 100 parts of black and supply one stream of pellets (larger in size) having a concentration of oil in the range of 9 to 10 parts per 100 parts of black and another stream having a concentration of oil in the range of 5.5 to 7.5 parts per 100 parts of black. This is easily accomplished by mechanical screening with an 18 mesh screen and putting the larger than 18 mesh pellets in one stream and the remaining pellets in another. It is also feasible and may be highly desirable in some applications to make a separation of the larger size pellets into two size classifications as is apparent from a comparison of the oil concentration in pellets of larger than 10 mesh in Sample No. 1 with the oil concentration of pellets between 10 and 18 mesh in Sample No. 3.

Certain modifications of the invention will become apparent to those skilled in the art and the illustrative details disclosed are not to be construed as imposing unnecessary limitations on the invention.

I claim:

1. A process for producing finished carbon black pellets of a predetermined narrow range of oil concentration which comprises spraying oil over the upper surface of a horizontally moving, tumbling, continuous bed of carbon black pellets of a size in the range of about 60 mesh to at least 10 mesh at a rate in proportion to the rate of movement of the bed whereby pellets of different sizes absorb different amounts of oil so as to incorporate in the pellets an oil concentration just outside of said narrow range; separating the effluent pellets from the bed into at least 2 size groups of narrow size ranges so as to obtain pellets in one of said size groups for a specific application having an oil concentration in said narrow range.

2. The process of claim 1 wherein an oil concentration just below said range, based on the weight of the whole mass of pellets is incorporated therein, and a larger size group of said pellets having an oil concentration in said range is selected.

3. The process of claim 2 wherein the average oil concentration of the total pellets is in the range of 8 to 9 weight percent and the selected size group is in the range of 10 to 18 mesh (U.S. sieve).

4. The process of claim 1 wherein an oil concentration just above said range, based on the weight of the whole mass of pellets is incorporated therein, and a smaller size group of said pellets having an oil concentration in said range is selected.

5. The process of claim 4 wherein the average oil concentration is in the range of 8 to 9 weight percent and the selected size group is a narrow range in the range of 18 to 60 mesh (U.S. sieve).

6. The process of claim 1 wherein the pellets are simultaneously formed and oiled by passing loose flocculent carbon black and carbon black pellet nuclei into a tumbling zone wherein the black and nuclei are tumbled in a continuous, horizontally moving bed while spraying oil into said bed.

7. A process for producing oiled carbon black pellets of a desired narrow range of oil concentration from a mass of pellets of a range of sizes from about 60 mesh (U.S. sieve) to about 10 mesh (U.S. sieve) which comprises incorporating oil in said mass of pellets in an amount which approximates said desired narrow range whereby at least one narrow size range of pellets of said mass is outside of said desired narrow range; and recovering from the oiled pellets a mass of pellets of a narrow size range in which the oil concentration is within said desired narrow range.

8. A process for producing oiled carbon black pellets of a narrow range of oil concentration from a mass of pellets of a wide range of sizes which absorb oil in different concentrations in accordance with size, even when subjected to uniform contacting with oil, which comprises uniformly contacting said mass of pellets with oil to incorporate approximately the desired concentration of oil therein; and recovering from the mass of oiled pellets a narrow size range which contains the desired narrow range of oil concentration.

References Cited in the file of this patent

UNITED STATES PATENTS

| | | |
|---|---|---|
| 1,651,733 | Sheppard et al. | Dec. 6, 1927 |
| 2,078,359 | Young | Apr. 27, 1937 |
| 2,411,873 | Firth | Dec. 3, 1946 |
| 2,461,089 | Smidth | Feb. 8, 1949 |
| 2,548,332 | Alexander et al. | Apr. 10, 1951 |
| 2,693,018 | Czarnecki | Nov. 2, 1954 |
| 2,699,381 | King | Jan. 11, 1955 |